US007225977B2

(12) United States Patent
Davis (10) Patent No.: US 7,225,977 B2
(45) Date of Patent: Jun. 5, 2007

(54) FRAUD DETERRENCE IN CONNECTION WITH IDENTITY DOCUMENTS

(75) Inventor: Bruce L. Davis, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 204 days.

(21) Appl. No.: 10/980,144

(22) Filed: Nov. 1, 2004

(65) Prior Publication Data

US 2007/0084912 A1 Apr. 19, 2007

Related U.S. Application Data

(63) Continuation-in-part of application No. 10/965,232, filed on Oct. 13, 2004.

(60) Provisional application No. 60/516,581, filed on Oct. 30, 2003, provisional application No. 60/512,033, filed on Oct. 17, 2003.

(51) Int. Cl.
*G06K 5/00* (2006.01)

(52) U.S. Cl. ..................... 235/380; 235/381

(58) Field of Classification Search ............ 235/380, 235/382, 382.1, 379, 375, 492, 493, 381; 705/1, 39, 36 R, 44
See application file for complete search history.

(56) References Cited

U.S. PATENT DOCUMENTS

| 5,790,674 | A |   | 8/1998 | Houvener et al. |
|---|---|---|---|---|
| 5,819,226 | A |   | 10/1998 | Gopinathan et al. |
| 5,884,289 | A | * | 3/1999 | Anderson et al. ............. 705/44 |
| 6,430,306 | B2 |   | 8/2002 | Slocum et al. |
| 6,513,018 | B1 |   | 1/2003 | Culhane |
| 6,597,775 | B2 |   | 7/2003 | Lawyer et al. |
| 2002/0147679 | A1 | * | 10/2002 | Tardif ........................ 705/39 |
| 2003/0052768 | A1 |   | 3/2003 | Maune |
| 2003/0099379 | A1 |   | 5/2003 | Monk et al. |
| 2003/0115459 | A1 |   | 6/2003 | Monk |
| 2003/0149744 | A1 |   | 8/2003 | Bierre et al. |
| 2003/0154406 | A1 |   | 8/2003 | Honarvar et al. |

(Continued)

FOREIGN PATENT DOCUMENTS

WO    WO03/071396    8/2003

OTHER PUBLICATIONS

"A Discussion of Data Analysis, Prediction and Decision Techniques," Fair Isaac, May 2003, 95pp.

(Continued)

*Primary Examiner*—Thien M. Le (57) ABSTRACT

According to one aspect, an air travel agent who reviews photo IDs of prospective travelers is advised by an expert system that directs the agent to give certain travelers more or less (or different) scrutiny, depending on the type of photo ID they present (e.g., depending on the jurisdiction from which their driver's license was issued). The system relies on a database in which historical incidents of fraud associated with different types of identification documents are logged, thereby serving as a resource by which future frauds might be better identified. Events that may signal increases in fraud beyond historical norms for particular types of ID documents, such as reported thefts of security laminates or other consumables used in their production, can also (or alternatively) be tracked in the database, and considered by the expert system. Such techniques allow security personnel to focus their efforts where they will do the most good. A variety of other technologies for mitigating fraud risks are also detailed.

24 Claims, 3 Drawing Sheets

U.S. PATENT DOCUMENTS

| | | | |
|---|---|---|---|
| 2003/0216988 A1 | 11/2003 | Mollett et al. | |
| 2004/0024693 A1 | 2/2004 | Lawrence | |
| 2004/0049401 A1* | 3/2004 | Carr et al. ................... | 705/1 |
| 2004/0064415 A1 | 4/2004 | Abdallah et al. | |
| 2004/0083169 A1 | 4/2004 | Dentler et al. | |
| 2004/0129787 A1 | 7/2004 | Saito et al. | |
| 2004/0138995 A1 | 7/2004 | Hershkowitz et al. | |
| 2004/0148240 A1* | 7/2004 | Gulati et al. ................. | 705/36 |
| 2004/0153663 A1 | 8/2004 | Clark et al. | |
| 2004/0181671 A1 | 9/2004 | Brundage et al. | |
| 2004/0230527 A1 | 11/2004 | Hansen et al. | |
| 2005/0043961 A1 | 2/2005 | Torres et al. | |
| 2005/0116025 A1* | 6/2005 | Davis ....................... | 235/380 |
| 2005/0127161 A1* | 6/2005 | Smith et al. ................ | 235/379 |
| 2005/0149348 A1* | 7/2005 | Baum-Waidner .............. | 705/1 |
| 2006/0149674 A1 | 7/2006 | Cook et al. | |

OTHER PUBLICATIONS

"Acxiom Patriot Act Solutions," Oct. 2002, 9 pp.

Clark, "Software Helps Spot Fraud in Fake Credit Applications," Wall Street Journal, May 14, 2003, 2 pp.

"Viisage Launches Innovative Identity Proofing Product," Press Release, Aug. 23, 2004, 2 pp.

"Viisage Unveils Vision for New Identity Solutions Product Suite, Creating New Paradigm for Ensuring Identity Authenticity," Press Release, Aug. 23, 2004, 3 pp.

"The Paper Chase: Give Me Your Paper, I'll Give You Mine," PowerPoint presentation at AAMVA Fraud Symposium, Nov. 2002, 23 pp.

Actions Taken to Strengthen Procedures for Issuing Social Security Numbers to Noncitizens, But Some Weaknesses Remain, GAO Report GAO-04-12, Oct. 15, 2003, 40 pp.

Opening Statement of Senator Richard J. Durbin, Hearing before the U.S. Senate Governmental Affairs Committee, Subcommittee on Oversight of Government Management, Restructuring, and the District of Columbia, Apr. 16, 2002, 5 pp.

Remarks of James Huse, Inspector General of Social Security Administration, to AAMVA Symposium on Motor Vehicle Fraud Prevention Initiatives, Nov. 15, 2002, 8 pp.

Testimony of Asa Hutchinson, Under Secretary, Department of Homeland Security, Before the Senate Committee on Finance, Sep. 9, 2003, 10 pp.

Sanders, Joe, "Identification Security for Driver Licensing, An International Effort," AAMVA Annual International Conference, Saskatoon, Saskatchewan, Aug. 2002, 24 pp.

"Evaluation of Current Practices," Virginia Dept. of Motor Vehicles, Sep. 2003, 69 pp.

"GAO Report Reveal Driver's Licensing Loopholes Risk National Security," AAMVA Press Release, Sep. 9, 2003, 2 pp.

"GTAD Technology," from ID Analytics web page, Aug. 2004.

"ID Analytics and Primary Payment Systems Bring the ID Score to Retail Banking to Fight Identity Fraud" Aug. 19, 2003, 2 pp.

"ID Network," from ID Analytics web page, Aug. 2004.

"Identity Risk Management Solutions," from ID Analytics web page, Aug. 2004.

Norman, et al, "Peronicx Methodology," Acxiom Corporation, Jan. 2003, 14 pp.

"Optimization Technology," from ID Analytics web page.

Testimony of Keith Kiser, Chair, American Association of Motor Vehicle Administrators, Driver's License Security Issues, Submitted to the House Select Committee on Homeland Security, Oct. 1, 2003, 11 pp.

"Battling ID Theft, Lenders Mobilize Old Friends with New Technologies," Bank Systems & Technology Online, Apr. 28, 2003, 3 pp.

"Stop Identity Fraud," Brochure re LexisNexis RiskWise InstantID, 2004, 2 pp.

"Superior Fraud Prevention," Brochure re LexisNexis RiskWise FraudDefender, 2004, 1 p.

Ginovsky, ABA Bankers News, (article re LexisNexis RiskWise InstantID) Oct. 14, 2003, 1 p.

"Bankers Systems and LexisNexis RiskWise Partner to Deliver Compliance Knowledge and Fraud Prevention Expertise in IDFlag," Press Release, Bankers Systems, Inc., Feb. 6, 2003, 2 pp.

Bigelow, "San Diego Startup Makes a Name for Itself in the Identity-Theft Wars," San Diego Union-Tribune, Jun. 10, 2003, 3 pp.

Weatherford, Mining for Fraud, IEEE Intelligent Systems, Jul.-Aug. 2002, 3 pp.

* cited by examiner

FRAUD DETERRENCE IN CONNECTION WITH IDENTITY DOCUMENTS

RELATED APPLICATION DATA

This application claims priority to provisional application 60/516,581, filed Oct. 30, 2003.

This application is also a continuation in part of copending application Ser. No. 10/965,232, filed Oct. 13, 2004, which claims priority to provisional application 60/512,033, filed Oct. 17, 2003.

These applications are incorporated herein by reference.

BACKGROUND OF THE INVENTION

Driver's licenses are widely used as proof of identity. With the increase in identity theft, there is a need to enhance the reliability of driver's licenses as an identity proof.

There are two classes of issuance systems for driver's licenses: over the counter (OTC) and central issue (CI).

Over the counter issuance systems print the license at the office where the applicant applied—usually while the applicant waits. The office is equipped with one or more data capture systems (e.g., photo camera, signature capture station, fingerprint sensor, etc.) and an ID card printer. After the applicant has established entitlement to a license, an operator captures a photo (and optionally a signature and/or a biometric, such as fingerprint), and causes a license to be printed. Data captured during the application process is relayed to a state database, where it can be used for law enforcement and other activities.

Central issue systems differ in that the license is not issued at the time of application. Instead, data is captured at the office, and sent to a central printing facility. That facility then prints the card and mails it to the applicant at the address printed on the license.

The problem of minimizing fraud in issuance of driver's licenses is a challenging one. The persons involved with license issuance are often hourly employees, who are relatively unskilled in document forensics and fraud investigation. They face large volumes of work, with which they must deal in relatively short periods of time.

In accordance with one aspect of the present invention, tools are provided to reduce the incidence of fraud in driver's license issuance. Some such tools aid in validating an applicant's identity, or in identifying some applicants for escalated levels of scrutiny. Other tools aid in tracking incidences of particular types of fraud in identification documents so that countermeasures can be developed to thwart the most likely sources of fraud.

DETAILED DESCRIPTION

According to one aspect of the invention, systems are provided to combat fraud in the issuance of driver's licenses ("enrollment").

Prior to issuance of a driver's license, state officials (e.g., field agents in the state's Department of Motor Vehicles (DMV)) typically require production of two or three identification documents ("collateral" documents). Some states require that at least one of these documents provide some evidence of the applicant's age. Different jurisdictions have different requirements as to the type and number of collateral identification documents needed. Acceptable documents in one exemplary state include (but are not limited to):

1. Original or certified copy of birth certificate;
2. Military or armed forces ID card;
3. Military discharge papers;
4. Selective service registration card;
5. U.S. Passport;
6. Non-U.S. Passport;
7. Alien registration card;
8. Immigration or naturalization documents;
9. Adoption decree or adoption certificate issued by a court;
10. Canadian driver's license, instruction permit, or identification card;
11. Out-of-state driver's license, instruction permit, or identification card;
12. Department of Corrections age and identity letter (with photo);
13. Department of Corrections inmate identification card;
14. Mexican consular ID card;
15. Student body ID card;
16. Social Security card;
17. Vehicle title or registration;
18. Company identification card;
19. Pistol or firearms permit;
20. Liquor Control service permit;
21. Personalized check/statement, or savings account passbook;
22. Driver license renewal reminder;
23. Voter registration card;
24. Property tax statement;
25. W-2 tax form;
26. Medical or health card;
27. Department of Corrections release letter;
28. Parole papers;
29. Certified copy of school transcript;
30. Pilot's license;
31. Court papers or court orders, such as legal name changes;
32. Affidavit of identity by parent.

(Items 1–14 are accepted as proof of age.)

To applicant's knowledge, there has been no systematic study concerning patterns of use of collateral documents presented at the time of enrollment.

In accordance with one aspect of the invention, information is gathered concerning documents presented at the time of enrollment, and this data is later analyzed to determine which documents are most frequently (and/or most rarely) correlated with fraud in the enrollment process.

Fraud in the enrollment process may be detected at various times, including during attempted enrollment (e.g., through automated or manual checking conducted before the license is issued to the applicant), or later (e.g., through a police arrest of an individual found to be carrying multiple driver's licenses with the same photo but different names).

In one particular embodiment, relevant information is collected in a database, including identification of collateral documents presented during enrollment, and whether fraud has been associated with the license. As the database grows, increasingly accurate analyses can be performed to match certain collateral documents to fraud (or to certain types of fraud).

One type of analysis is correlation. A given enrollment document can be checked for its incidence of involvement in fraudulent and non-fraudulent license procurements. If the incidence for a particular type of collateral document deviates from the mean, use of that document can be regarded as being indicative of a higher, or lower, than normal possibility of fraud.

Consider a database of 10 million driver license records, with an overall fraud rate of 0.1%. Licenses for which a U.S. passport is presented as a collateral document may have an overall fraud rate of 0.02%, whereas licenses for which a student ID is presented as collateral may have an overall fraud rate of 1%. The passport evidently has a relatively strong negative correlation with fraud, whereas the student ID has a relatively strong positive correlation.

The example just given is a relatively simple one. Much more sophisticated analyses can be conducted.

One class of powerful analysis techniques is known as factor analysis. Such techniques consider a broad range of input variables, and assess their contributions (both individually and in conjunction with other input variables) to different results (e.g., incidence of fraudulent licenses, and arrests for speeding). (A number of books treat the subject in depth. A popular text is Kim et al, "Factor Analysis," Sage Publications, 1979.)

By applying factor analysis, outcomes contrary to the results given above may be discovered. For example, factor analysis may reveal that U.S. passports are positively correlated with fraud, if presented with a naturalization certificate as a companion collateral document. Likewise, student IDs may be found to be negatively correlated with fraud, if accompanied by an affidavit of an accompanying parent.

Factor analysis is an exercise in matrix mathematics and statistics. Another analytic technique relies on neural networks and so-called "fuzzy logic." These techniques look for patterns in data that might look random on casual inspection.

The foregoing techniques, and others, are used in the field of "data mining," for which many different software tools are available. The artisan is presumed to be familiar with such art.

The results of such analyses can be used in various ways. In one, state employees who issue driver's licenses are provided with the results, and instructed to spend relatively more or less time questioning an applicant depending on whether the collateral documents suggest (or not) an increased likelihood of fraud. Thus, personnel resources are thus deployed in a manner giving them a heightened fraud-fighting effect—with more of their time spent on cases where fraud is more likely.

The employees can be provided with the result data in tabular form (e.g., a listing of collateral documents that may trigger more or less scrutiny of an applicant), or the employee can be guided by a computer tool. In this latter arrangement, the user interface through which the employee annotates the DMV database record with information about the collateral documents used, can respond to the employee—based on the particular pair (or triple) of documents offered—and offer guidance as to actions the employee should, or needn't, take. Such arrangements may be regarded as expert systems—with expertise in reducing issuance of fraudulent licenses.

In one embodiment, the computer system computes a score that ranks the applicant, based on the forms of collateral ID produced. (As noted below, other variables may also factor into this computation.) The score thus serves as a figure of merit for the reliability of the collateral identification, on which different actions can depend.

Consider a scoring system that yields an average value of 100, with higher reliability scores indicating less likelihood of fraud. Persons scoring between 95 and 105 may be given a regular degree of scrutiny. Persons scoring less than 95 may be given progressively increasing amounts of scrutiny.

For example, if the collateral documents indicate a reliability score of 93, the DMV official may seek to corroborate identity by a fast, inexpensive, check. An example may be consulting a telephone directory database, to confirm that the name and address given to the DMV are consistent with information maintained by the local telephone company in their service records.

If the reliability score is 90 or less, the DMV official may seek to corroborate identity by a slower, perhaps more expensive check. For example, the official may solicit the applicant's social security number (if this isn't routinely provided as part of the enrollment process). When typed by the official into the DMV computer system, the system can check a federal social security database to confirm that a person by applicant's name was issued that social security number.

For a score of 87 or less, both the telephone directory and social security check may be utilized.

For a score of 84 or less, a still more rigorous check may be performed. For example, identifying information (e.g., name, address, social security number) can be passed to credit reporting agency, which responds with a credit report or credit score (e.g., FICO, an acronym for Fair Isaac & Company). This report is examined for consistency with the identifying information provided to the DMV official.

For a score of 81 or less, the foregoing checks may all be conducted and, in addition, the person's identifying information may be checked against local, state, and/or federal law enforcement databases.

(The scoring thresholds at which more rigorous verification is undertaken are, in the examples above, uniformly-spaced scores. More likely, these would be statistically-based brackets, e.g., based on standard deviation.)

These verification checks noted above needn't be manually initiated or conducted by the DMV employee; they can be undertaken automatically by a computer system. In some cases, the reliability score that triggers the checks isn't even provided to the DMV employee.

The foregoing are just a few examples of a great many verification procedures that may be performed. Some verification procedures may be tied to the particular forms of collateral identification offered by the applicant.

For example, if a military discharge certificate is offered, the DMV computer may consult with a federal database containing military service records to confirm that a person with applicant's name and birth date served in the military. (If additional data is captured from the collateral document—such as the discharge date—this information can be checked, also, against the military database.)

Likewise, if a W-2 tax form is presented, applicant's employment with the stated employer can be checked through on-line employment-reporting databases, such as a credit reporting bureau. (Again, to fully exploit such resources, it may be desirable to capture information from the collateral documents other than confirming applicant's name, and optionally address. In the W-2 case, the name of the employer could be captured and logged in the DMV database record, and used as an additional item for verification.) Or, more simply, an on-line check can be performed to confirm that the company listed on the W-2 has a presence within a given radius of the applicant's stated home address.

If the applicant passes the applicable verification checks, the license may be issued in the normal way. If one or more checks gives anomalous or conflicting results, different action may be taken.

If the telephone directory search reveals no listing, the applicant may plausibly explain that they just moved into the jurisdiction and don't yet have telephone service. In such case, the protocol may involve attempting a different form of verification, such as the social security number check. Or the protocol may require the DMV official to solicit a third (or fourth) item of acceptable identification. A new reliability score can then be determined based on the enlarged set of collateral documents. If it still falls below 95, other checks can be run (e.g., the social security database check). If such other check(s) gives no cause for further suspicion, the driver's license can be issued in the normal course.

Some verifications may suggest that a fraud is being attempted, or that a crime has been committed. For example, consider an applicant who presents a savings account passbook as an element of identification. If the expert system—on considering the ensemble of proffered collateral documents—determines a reliability score of less than 90, the system may suggest that the official check (or the computer may itself check) with the issuing bank to confirm that the passbook is valid. On checking its records, the bank may report that the passbook was stolen during a house break-in.

Such a circumstance can trigger different responses. One is for the DMV official to advise the applicant that the computer system has flagged the application for further screening, and invite the applicant to return to the DMV office on the next business day to complete the process. (Optionally, the official may be requested to surreptitiously observe the applicant's vehicle as they depart the parking lot, and enter a description of the vehicle and/or license plate information.) Another response is to electronically send an alert to an appropriate law enforcement official while the person is at the counter, or to send the complete dossier of information collected from the applicant (either in real-time or later, e.g., overnight).

Another response is to issue a license. Although counter-intuitive, this step may be desirable from a law enforcement standpoint, e.g., transforming an attempted fraudulent procurement of a license into an actual fraudulent procurement offense. The issued license may be marked so as to indicate, to authorized inspectors such as law enforcement, that is it suspect (e.g., a different color background may be printed behind the facial portrait, or a bar code or watermark formed on the license may convey such an alert, etc). Or a conventional license may be issued, and remedial steps can be taken later to recover same (e.g., seizure, at the time of arrest for the suspected offense).

Other responses, and combinations of responses, can of course be used.

Naturally, frauds discovered through such checking in the enrollment process should be logged in the database so as to enhance the information on which the expert system decisions are based.

In some embodiments, frauds noted in the database may be given a confidence score. A fraud that is established through a court decision may be given a high confidence score. A fraud that is suspected but never verified (e.g., ambiguous verification results, with the applicant asked to return the next day but never returning) may be given a lower confidence score. Again, this confidence measure is another variable that can figure into the expert system data analysis.

Desirably, a rich set of data relating to each examination/verification procedure is collected and added to the DMV database. This information will allow even more accurate reliability scoring to be determined in the future. That is, the reliability scoring can be based not just on the two or three types of collateral identification documents presented at the time of application, but can also be a function of the results of various verification procedures. And over the course of months, as reports of fraud are added to the database, the relevance of certain verification factors can change from obscure to clear.

With sufficient experience, for example, the expert system may discern that certain verification check results—in combination with certain other circumstances (e.g., in combination with certain types of collateral documents)—may substantially change the statistical likelihood of fraud. Consider the applicant with an initial reliability score (based on the collateral documents alone) of 93. A telephone directory check is made. The check does not confirm applicant's information. The failure of this check can now be added into the set of data on which the system computes the score, yielding a modified score. The modified score—since it is a function of a richer set of input variables—permits more accurate categorization of the fraud risk.

Based on analysis of historical data, for example, the system may advise that failure of the telephone directory check changed the applicant's score from a 93 to an 84. This steep drop in score may be because the applicant used a corporate ID and a vehicle registration as collateral IDs, and these have historically been found to be associated with fraud in contexts where the telephone directory check is failed. (In contrast, if the applicant presented a pilot's license and a U.S. passport as collateral documents, the score might have only fallen to a 91, again based on historical patterns of experience.)

Thus, results from verification checks can be used as additional factors in assessing fraud risk.

Still other factors can be introduced into the assessment. One is credit history or scoring (e.g., FICO score). In the enrollment process, the DMV system may automatically solicit a FICO score from one or more of the credit reporting agencies (e.g., Equifax, Experian, TransUnion). If historical data stored in the DMV database includes such information for a meaningful number of prior applicants, the role of such a score as a factor in fraud can be determined, and used in establishing a reliability score for the application. (If the historical data is insufficient to do a rigorous analysis, then the FICO score might be used as a simple "plus" or "minus" factor. Thus, the reliability score of an applicant with a FICO score of more than 700 (on a scale extending to 850) may be increased by 2. The score of an applicant with a FICO score of below 450 may be decreased by 2.)

Another factor that can be included in assessing the reliability score is the applicant's age. Historical data compiled in the database may establish that applicants of different ages have different incidences of fraud. Again, the role of age as a factor in fraud can be mined from the data, and used as another variable in determining the reliability score. (Or, again, it can serve as a simple "plus" or "minus" factor, e.g., if the applicant is below 23 years old, his score is reduced by 2; if between 23 and 26 his score is reduced by 1; if over 70 his score is increased by 3; if over 80 his score is increased by 5.)

Many other factors may also be utilized in such systems, subject to applicable legal considerations. These may include gender, zip code, type or model year of car, birthplace, marital status, etc., etc.

Over time, a large set of data will be available in the data sources that are consulted to compute a reliability score (i.e., both the fraud database, and the ancillary verification sources). To further increase accuracy, trends in the data over time can be used in rendering the expert advice. For example, the Mexican consular card may have a relatively high historical incidence of fraud associated with it. However, further analysis may show that such fraud has dropped steeply in the past 9 months (e.g., due to redesign of the card, or re-working of the procedures for its issuance). Thus, in assessing risk, the historical high risk may be tempered with the better, recent, experience.

This trend analysis can be performed in various ways. One is to assess the data patterns over different periods to discern any notable variance. Thus, incidence of fraud may be computed over the life of the database (e.g., 0.2%), over the past two years (e.g., 0.1%), and over the past six months (e.g., 0.04%). Given these substantially different figures, the system can recognize that there is a shift underway in the statistics associated with this variable. Thus, the system may depart from its usual protocol (e.g., using data from the past 2 years), and instead use the average of the 2 year and the 6 month statistics (i.e., 0.07% in the case just given).

In some cases, it may be appropriate to extrapolate a trend. This may be particularly prudent in cases where the risk appears to be rising. Since the information in the database is necessarily from the past, a more accurate assessment of the current risk may be obtained by determining a trend curve, and estimating the current incidence of fraud by reference to that trend.

Consider a collateral document having fraud incidences over different window periods as follows:

| Data Window | Fraud Incidence |
| --- | --- |
| 12–9 months ago | 0.1% |
| 9–6 months ago | 0.13% |
| 6–3 months ago | 0.17% |
| 3 months ago-current | 0.22% |

Analysis of this data shows an exponential growth of about 30% per quarter. This figure can be applied to the historical data to obtain an estimate of the risk today.

For example, the mid-point of the most recent quarterly window is 1.5 months ago. Applying 1.5 months of 30% quarterly growth to the 0.22% figure from the most recent quarter yields an estimate of 0.25% today.

(More sophisticated analytic techniques take into account that the fraud data for the most current quarter is likely less comprehensive than that from successively older quarters, since less time has elapsed for fraud after issuance to be discovered and recorded (e.g., police stops and arrests). Thus, other techniques can apply trend analysis using a data confidence measure—relying more heavily on the data that has more indicia of reliability.)

The foregoing procedures were described in the context of over the counter issuance systems. Additional flexibility is available in central issue systems, since there is more time available to conduct verification checks.

In a central issue system, the expert system can consider the applicant over a period spanning hours or days. Many of the steps of the process may be performed at night, when database and bandwidth connection charges may be reduced. With the luxury of increased time, more comprehensive checking can be undertaken. Again, each check provides more data by which the applicant's reliability score can be further refined. If the process requires additional material from the applicant (e.g., a further piece of collateral identification), a letter can be mailed soliciting the information. Or a telephone solicitation can be made—either automated or by a human operator.

The database containing fraud data, which is mined as described above, needn't be limited to a single state. A larger sample set, and higher reliability results, may be obtained by using data from several states. This data can be assembled in a single database. Alternatively, several separate databases may be maintained, and consulted individually for the information needed for the analysis.

In some arrangements the reliability scoring can be performed by a public agency, such as a state department of motor vehicles. In others, the scoring can be performed by a private company—much like credit scores calculated by credit bureaus.

One use to which the accumulated fraud data can be put is legislative: changing the list of documents approved to establish identification. For example, legislative review of historical data may indicate that—of the earlier-listed 32 documents acceptable to establish identity—two have much higher incidences of associated fraud than any of the others. Accordingly, the legislature may decide to amend the list of acceptable documents to remove those two apparently less reliable documents.

Again, the aim should be continuous improvement—using the richer data that accumulates over time to perform more discerning analyses in the service of fraud reduction.

In addition to changing the list of acceptable documents, other changes can also be made in response to patterns discerned in the collected data. One is to enact countermeasures targeting certain high-incidence types of frauds. Consider frauds involving licenses that have been fraudulently produced or altered (as opposed, e.g., to frauds involving officially-issued documents, but based on false identities). Such fraudulent production or alteration may be of several types, e.g., photo-swapping in an officially-issued license; altering text on an officially-issued license; fraudulently printing a license using a home ink-jet printer, etc. Desirably, the fraud-tracking database has indexed fields by which such types of fraud can be separately identified. Review of historical data from such a database in one state may reveal that most such fraud is effected by photo-swapping. Data for another state may reveal that ink-jet counterfeiting is more common. As these patterns become evident, appropriate countermeasures can be implemented in design of the license. In the former case, a security laminate might be newly provided over the photograph—to make photo tampering more evident. In the latter case, fluorescent inks might be used—inks that are not commonly available for home ink jet printers.

The fraud database may also track different varieties of fraud involving licenses that are issued by the appropriate state agency and not tampered with. One may be the situation of several licenses being issued to the same person—with different names on each. Another may be licenses bearing incorrect birthdates (e.g., in reliance on altered collateral documents). If the former type of fraud is prevalent, an appropriate countermeasure can be deployed (e.g., face-matching the applicant's photo against a library of photos from all other licenses previously issued). If the latter type of fraud is prevalent, then more reliable age-establishing documents should be required, or more effort should be spent validating the birth date stated by the applicant.

Again, a theme is identifying what system weakness is being exploited the most, and then addressing it.

The examples given above are based on data that is accumulated slowly over time. However, related principles can be used in more dynamic contexts.

Consider a ticketing counter at an airport. Travelers may check-in for flights presenting driver's licenses from all 50 states, as well as from various foreign countries. Should the agent regard all as equally trustworthy?

Probably not. Historical data—if compiled in one or more databases—may indicate that licenses from some jurisdictions are more reliable than others. Many of the September 11 hijackers, for example, carried licenses from a certain state. The reliability of different jurisdictions' licenses may be determined by historical data collection and analysis techniques like that given above. If a license from, e.g., Oklahoma, scores as less reliable than a license from New Jersey, then the airline agent should probably spend more effort validating a traveler presenting an Oklahoma license than one presenting a New Jersey license.

Such a software system can also respond to fast-moving events. If a pallet of security consumables (e.g., a laminate with the state seal, micro-printed with a known batch number) is stolen from a DMV office in Mississippi, for example, there may soon be a deluge of authentic-looking forgeries of the Mississippi driver's license in circulation. An airline agent presented with a Mississippi license should probably give the traveler a bit more scrutiny.

Desirably, airline agents and others who rely on driver's licenses to establish identity should have available a software system that serves as a virtual expert to assist them. The agent would enter the jurisdiction of the presented license, and the software system would respond with relevant coaching. If a New Jersey license is presented, the system may offer no cautions. Or it may inform the agent that the NJ license is rarely suspect, but then highlight the circumstances that are seen in the few instances of reported fraud. If an Oklahoma license is presented, the expert system may suggest soliciting and checking a second piece of identification. If a Mississippi license is presented, the system may advise the agent of the recent news involving that license. The system may continue by suggesting how the license might be scrutinized to determine if the stolen laminate has been used (e.g., use a magnifying glass to read the micro-printed serial number, to see if it matches the stolen batch), or the system may simply suggest that a second piece of identification be solicited and checked.

As before, such software can help personnel allocate their efforts where they will be most effective in preventing fraud.

Figure 1:
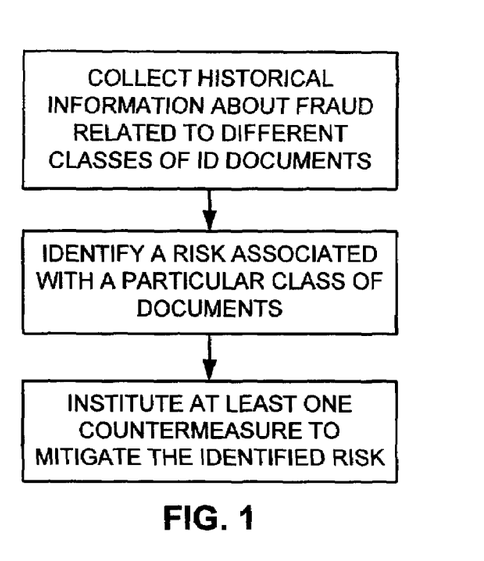
FIGS. 1–5 illustrate exemplary methods detailed herein.
Figure 2:
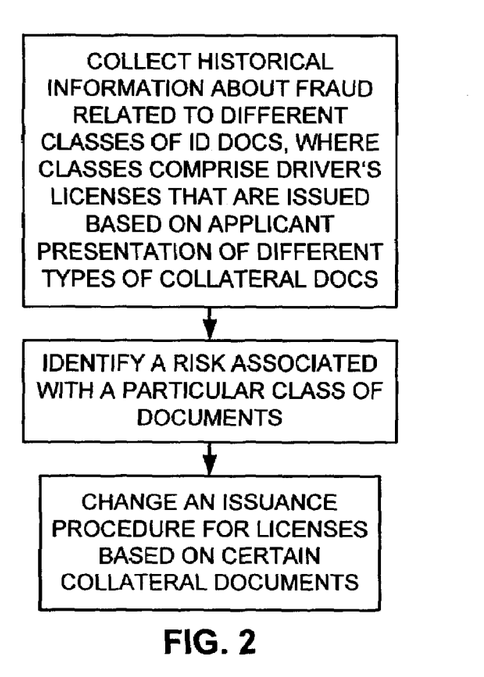
Figure 3:
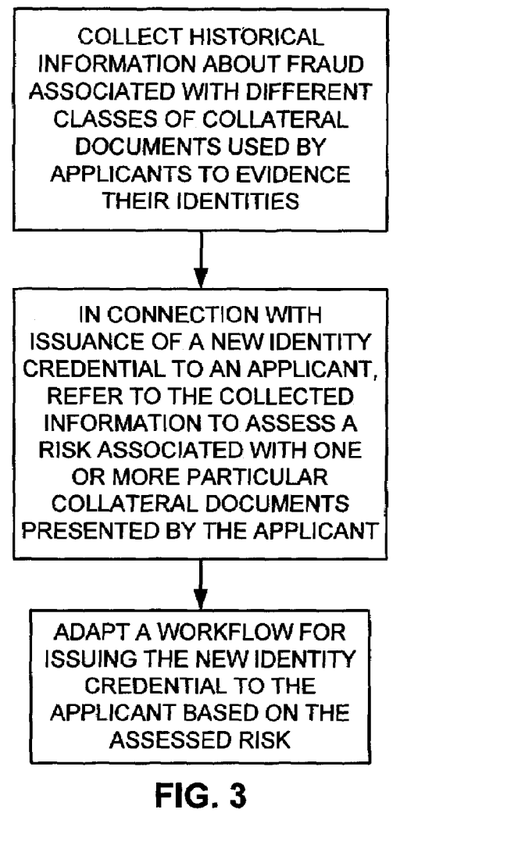
Figure 4:
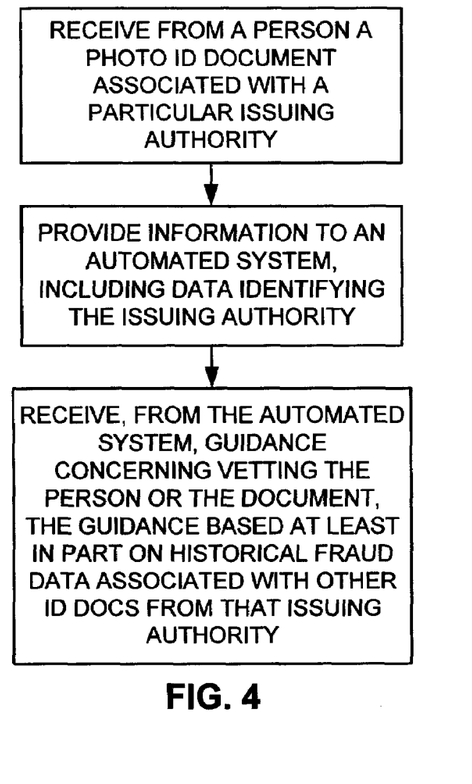
Figure 5:
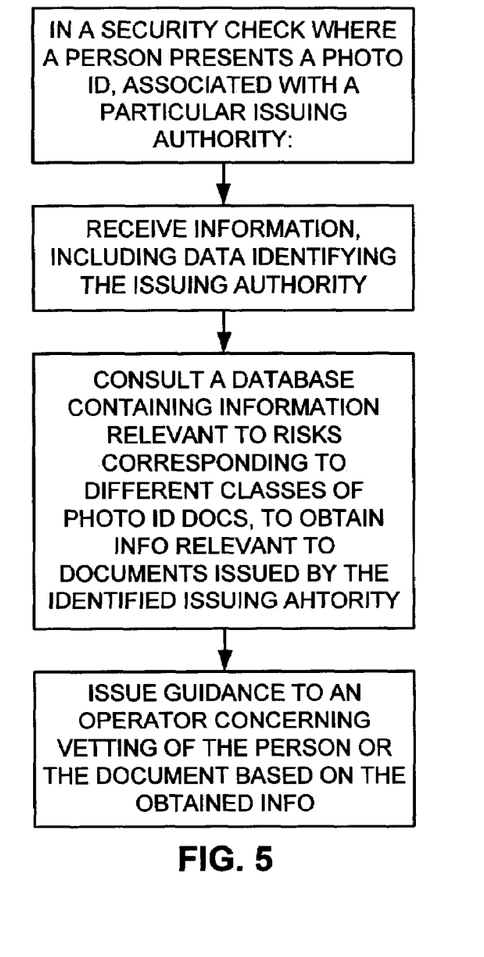
Figure 6:
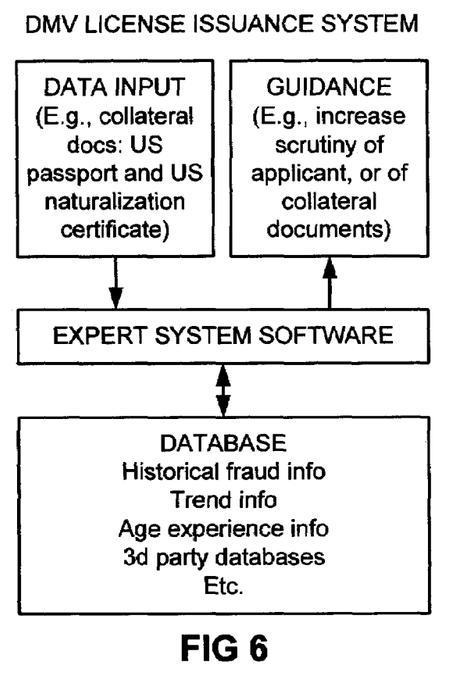
FIGS. 6–7 illustrate exemplary systems detailed herein.
Figure 7:
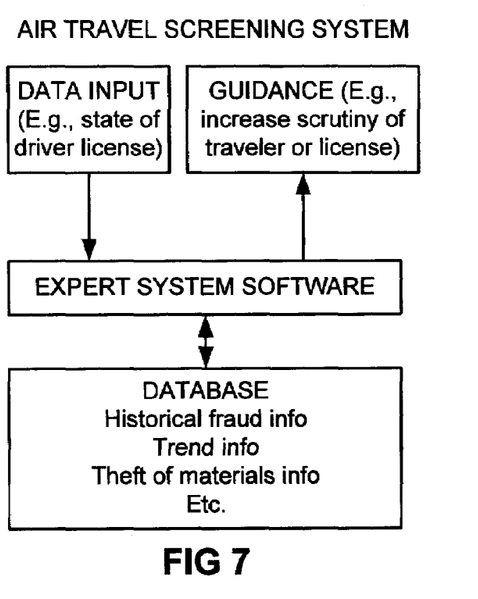

FIGS. 1–7 illustrate some of the above-described methods and systems.

Another aspect of the present technology involves tracking the contexts in which a particular driver's license is used. For example, if a driver's license is presented as a form of identification by a person cashing a check in New York, and the same license is presented an hour later by a traveler checking in for a flight at Los Angeles International Airport, then something is amiss.

Desirably, a record is captured each time a license is presented in a commercial or identification transaction. The record may be generated in various ways. For example, the license can be imaged, and technology applied to read the data on the card (e.g., OCR can be used to "read" text and barcode data, while steganographically encoded data can be decoded by suitable image processing). The license could also be swiped through a reader, that captured data from a magnetic stripe and/or optically encoded machine readable indicia on the card.

The license information—together with place and time of presentment—can be forwarded to a database. The database can be maintained by the state that issued the driver's license, or a centralized database can be used. (Such data capture is similar to the familiar practice used with credit cards, where every use is logged as to place and time.)

It is possible that such data collection may be mandated by legislation, seeking to thereby enhance national security. Alternatively, the data collection can be voluntary, with incentives provided to those who capture such data (and/or to those who assent to such capture from their licenses).

To illustrate, legislation might require presentment and capturing of driver license data from persons mailing packages at the U.S. Post Offices and other parcel services. The President's Commission on the Unites States Postal Service has indicated a desire to be able to better track the origins of mailed parcels, e.g., to counter terrorism by mail.

On the incentive side, a vendor who captures license data from persons who pay a bill by check and offer a license as identification, may be given preferential commercial terms than a competing vendor who does not do so. Thus, the former merchant may have less liability for accepting bad checks (insufficient finds), or may be charged a lower monthly account fee by the bank.

Similarly, the person presenting the license may be rewarded for allowing automated data capture. (Manual data capture is already widely accepted, e.g., a supermarket clerk writing a driver's license number on a check.) Again, in the checking case, lower fees may be offered. Alternatively, small cash rewards or other premiums may be available.

Once captured, analyses may be performed as to usage patterns for driver's licenses. One outcome of such analysis is flagging inconsistent usage scenarios, such as the one noted above (i.e., physical presentment of the same license in New York and California within an hour). When such inconsistent usage is detected, a responsive action can be taken (such as denying boarding to an aircraft).

Pending application Ser. No. 10/370,421 includes a variety of teachings relevant in combination with the present disclosure. One concerns on-line renewal of driver's licenses.

Likewise, pending applications 60/418,129 and 60/429,501 detail biometric technologies for combating fraud in driver's license issuance, including searching image collections for duplicate facial images.

Reference has been made to driver's licenses and state authorities. However, it will be recognized that the technology isn't so limited. Other articles of identification (e.g., social security cards, passports, etc.) can be made more secure by the methods described above. And the issuers of the identification needn't be states—they can be other jurisdictions or entities, public or private.

Analytic techniques other than those noted above can also be employed. A predictive modeling technique used to detect cell phone fraud is detailed in U.S. Pat. No. 6,597,775, and its teachings can likewise be applied to detect fraudulent use of driver's licenses or other identity document. Similarly, U.S. Pat. No. 6,513,018 details a system for scoring the likelihood of a result, and such technology can be applied in generating reliability scores of the sort detailed above.

To provide a comprehensive disclosure without unduly lengthening this specification, the patents and applications cited above are incorporated herein by reference.

I claim:

1. An improved method for identity credential issuance, in which applicants submit one or more collateral documents to evidence their identities, the method comprising:
   collecting historical information about fraud associated with different classes of collateral documents used by applicants to evidence their identities;
   in connection with issuance of a new identity credential to an applicant, referring to said collected information to assess a risk associated with one or more particular collateral documents presented by said applicant; and
   adapting a workflow for issuing said new identity credential to said applicant based on said assessed risk.

2. The method of claim 1 wherein said adapting the workflow comprises undertaking at least one of several different confirmatory checks of identity, dependent on said assessed risk.

3. A method comprising:
   collecting historical information about fraud related to different classes of identification documents;
   referring to said collected information to identify a risk associated with a particular class of documents; and
   instituting at least one countermeasure to mitigate said identified risk, said countermeasure serving to redress a particular security vulnerability that gives rise to said identified risk;
   wherein said countermeasure entails a change in a procedure used to issue a state's driver's licenses.

4. A method comprising:
   as part of a security check, receiving from a person a photo identification document, said photo identification document being associated with a particular issuing authority;
   providing information to an automated system including data identifying said issuing authority; and
   receiving from the automated system guidance concerning vetting the person or the document, said guidance being based at least in part on historical fraud data associated with other identification documents associated with said issuing authority.

5. The method of claim 4, performed at an airport.

6. As part of a security check wherein a person presents a photo identification document, said photo identification document being associated with a particular issuing authority, a method performed using an automated system comprising:
   receiving information including data identifying said issuing authority;
   consulting a database containing information relevant to risks corresponding to different classes of photo identification documents, to obtain information relevant to documents issued by said identified issuing authority; and
   issuing guidance to an operator concerning vetting of said person or said document based thereon.

7. The method of claim 6 in which:
   said obtained information indicates that photo identification documents issued by said particular issuing authority are relatively less reliable than photo identification documents issued by one or more other issuing authorities; and
   said guidance indicates that the person or document should receive additional scrutiny.

8. The method of claim 6 in which the database contains data about historical fraud associated with photo identification documents of different classes.

9. The method of claim 6 in which the database contains information indicating that incidents of fraud associated with a particular class of photo identification document may rise.

10. The method of claim 9 in which said information relates to theft of materials used in the production of one or more classes of photo identification documents.

11. The method of claim 6 in which said guidance comprises requesting additional proof of identity from the person.

12. An expert system that helps guide an air travel agent in clearing prospective travelers for air travel, the system receiving data identifying a type of photo ID presented by a traveler, and advising the agent how to process the traveler, said advice being based at least in part on the type of presented photo ID.

13. The system of claim 12 wherein the system advises the agent to apply relatively more scrutiny to a first traveler, who presents a photo ID from a first state, than to a second traveler, who presents a photo ID from a second state, due to differences in historical fraud experience associated with photo IDs issued by the first and second states.

14. The system of claim 12 in which said advice is based in part on historical fraud data associated with the type of photo ID presented by the traveler.

15. The system of claim 12 in which said advice is based in part on one or more events that may signal an increase in fraud for a particular type of photo ID beyond historical norms.

16. The system of claim 15 in which said event comprises theft of materials used in producing a type of photo ID document.

17. The system of claim 12 in which the photo ID is a driver's license issued by a state, and said advice is based in part on the state that issued said license.

18. A method comprising:
   collecting historical information about fraud related to different classes of identification documents, said classes comprising driver's licenses that are issued based on applicant presentation of different types of collateral documents;
   referring to said collected information to identify a risk associated with a particular class of documents; and
   instituting at least one countermeasure to mitigate said identified risk;
   wherein said countermeasure entails a change in a state procedure concerning issuance of driver's licenses based on certain collateral documents.

19. A method comprising:
   collecting information about fraud related to different general types of government-issued identification documents;
   when presented with a particular government-issued identification document, referring to said collected information to identify a risk associated with a general type of government-issued identification document to which said particular document belongs; and
   instituting at least one countermeasure to mitigate said identified risk.

20. The method of claim 19 wherein said collecting comprising collecting information about fraud related to first and second general types of government-issued identification documents, where the first general type comprises driver's licenses from a first state, and the second general type comprises driver's licenses from a second, different, state.

21. The method of claim 19 wherein said instituting at least one countermeasure comprises soliciting a second identification document to confirm an identity represented by said particular government-issued identification document.

22. The method of claim 19 wherein said instituting at least one countermeasure comprises examining said particular government-issued identification document for a particular feature.

23. An improved method of identity credential issuance, in which applicants employ one or more options set forth in a defined procedure to evidence their identities, the method comprising:

collecting historical data about identity credential frauds, including compiling data indicating particular options employed by applicants involved in said frauds to evidence their identities;

referring to said collected data to assess a risk associated with one or more of said options; and revising said defined procedure based on said risk assessment.

24. An improved method of state driver's license issuance according to claim 23, wherein the options set forth in said defined procedure specify different types of collateral identity documents that are accepted to establish applicant identity, and the method includes revising said defined procedure to no longer accept a certain type of collateral identity document to establish applicant identity.

* * * * *